Figure 1:
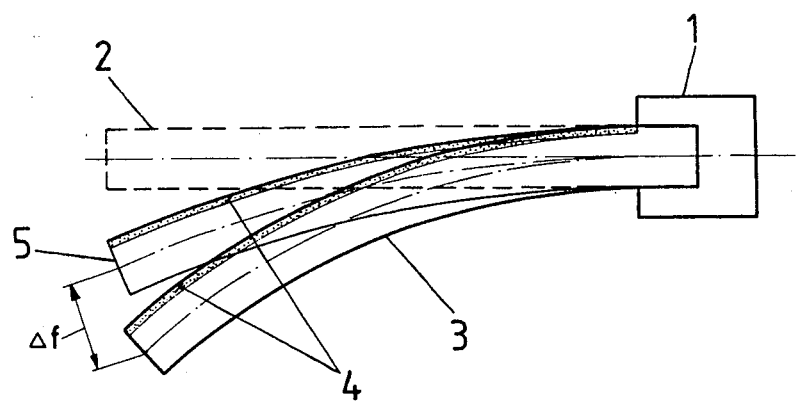

United States Patent [19]
Albrecht et al.

[11] 4,411,711
[45] Oct. 25, 1983

[54] PROCESS TO PRODUCE A REVERSIBLE TWO-WAY SHAPE MEMORY EFFECT IN A COMPONENT MADE FROM A MATERIAL SHOWING A ONE-WAY SHAPE MEMORY EFFECT

[75] Inventors: Joachim Albrecht, Mülligen; Thomas Duerig, Nussbaumen; Günther Schroeder, Birmenstorf, all of Switzerland

[73] Assignee: BBC Brown, Boveri & Company Limited, Baden, Switzerland

[21] Appl. No.: 402,273

[22] Filed: Jul. 27, 1982

[30] Foreign Application Priority Data

Feb. 5, 1982 [CH] Switzerland ............................ 705/82

[51] Int. Cl.$^3$ .............................................. C21D 8/00
[52] U.S. Cl. .......................... 148/11.5 A; 148/11.5 C; 148/402; 420/460
[58] Field of Search .... 428/960; 148/11.5 A, 11.5 C, 148/402

[56] References Cited

U.S. PATENT DOCUMENTS

4,019,925  4/1977  Nenno et al. ...................... 428/960
4,144,057  3/1979  Melton et al. ...................... 428/960

OTHER PUBLICATIONS

C. M. Wayman, Some Applications of Shape-Memory Alloys, Jun. 1980.
W. A. Rachinger, A "Super Elastic" Alloy Based On The Martensite Transformation, May 1960.

*Primary Examiner*—L. Dewayne Rutledge
*Assistant Examiner*—Debbie Yee
*Attorney, Agent, or Firm*—Oblon, Fisher, Spivak, McClelland & Maier

[57] ABSTRACT

A noticeable two-way effect can be induced in a component consisting of a shape memory alloy exhibiting only a one-way effect by inhomogeneous deformation of the cross-section so that one part of the component cross-section is deformed sufficiently to hinder the free movement of the one-way effect in the lesser deformed part. Component in the form of a tension/compression (6/8), bending (3), or torsion rod.

5 Claims, 4 Drawing Figures

PROCESS TO PRODUCE A REVERSIBLE TWO-WAY SHAPE MEMORY EFFECT IN A COMPONENT MADE FROM A MATERIAL SHOWING A ONE-WAY SHAPE MEMORY EFFECT

This invention concerns a process to produce a two-way shape memory effect.

With memory alloys in general, the difference between the so-called two-way effect and the one-way effect must be distinguished. While the latter is generally more pronounced, better known (e.g. - Ni-Ti and the $\beta$-brasses) and has led to numerous applications, the two-way effect is more problematic and difficult to control. There is, however, a common technological demand for components which show a two-way effect of sufficient magnitude to open further interesting fields of application. Usually the temperature of the martensitic transformation in the classical two-way shape memory alloys falls into an undesirable temperature range. There are, however, a number of shape memory alloys, especially the $\beta$-brasses such as the classical Cu-Al-Ni and Cu-Al alloys, which have a suitable transformation temperature; these alloys have a remarkable one-way effect, but a negligible two-way effect.

The following documents can be quoted as "state of the art":

R. Haynes, Some Observations on Isothermal Transformations of Eutectoid Aluminium Bronzes Below their $M_S$ - Temperatures, Journal of the Institute of Metals 1954–1955, Vol. 83, pages 357–358; W. A. Rachinger, A "Super Elastic" Single Crystal Calibration Bar, British Journal of Applied Physics, Vol. 9, June 1958, pages 250–252; R. P. Jewett, D. J. Mack, Further Investigation of Cu-Al Alloys in the Temperature Range Below the $\beta$ to $\alpha + \gamma_2$ Eutectoid, Journal of the Institute of Metals, 1963–1964, Vol. 92, pages 59–61; K. Otsuka and K. Shimizu, Memory Effect and Thermoelastic Martensite Transformation in Cu-Al-Ni Alloy, Scripta Metallurgica, Vol. 4, 1970, pages 469–472; K. Otsuka, Origin of Memory Effect in Cu-Al-Ni Alloy, Japanese Journal of Applied Physics, Vol. 10, no. 5, May 1971, pages 571–579.

There is, therefore, a demand for components made from shape memory alloys of the $\beta$-brass type, which have a transformation temperature suitable for certain specific applications, while exhibiting a noticeable two-way effect. The purpose of this invention is to develop a process to induce a considerable reversible two-way shape memory effect in components made of alloys normally exhibiting a one-way shape memory effect, independent of the component's working conditions.

This goal is achieved by the features indicated in claim 1.

The invention will be described in the following working examples and illustrated in the attached diagrams.

The figures show:

FIG. 1—A bending element consisting of a memory alloy shot peened on one side.

Figure 2:
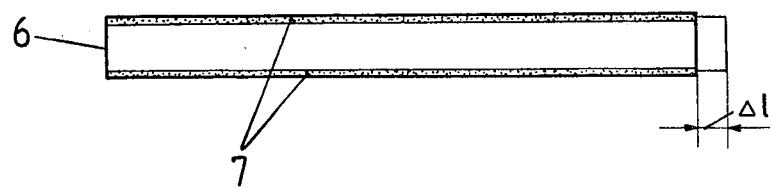

FIG. 2—A swaged tension rod consisting of a shape memory alloy.

Figure 3:
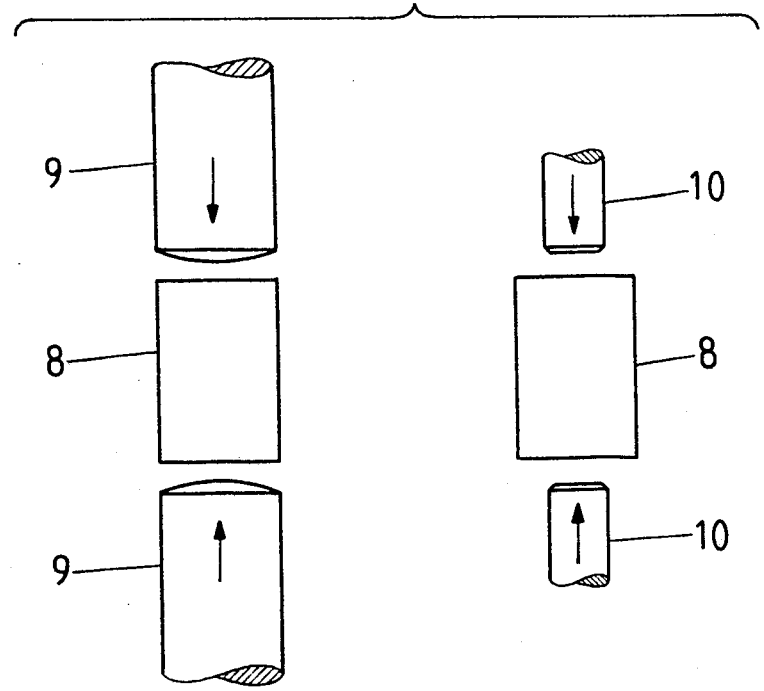

FIG. 3—The principle to inhomogeneously deform a short rod by means of a compression punch.

FIG. 4—The deformation and stress distribution in a short rod ;inhomogeneously deformed according to FIG. 3.

FIG. 1 shows a bending element which was inhomogeneously deformed by shot peening on one side. Item 1 is a mounting fixture, Item 2 is a shape memory bending element (typically prismatic) shown prior to deformation. Item 3 is a bending element after shot peening on one side, typically distorted due to the inhomogeneous nature of the deformation. Item 4 is the shot peened and work hardened surface containing large compressive residual stresses. Item 5 illustrates the shape of a bending element after shot peening and subsequent heating to 220° C. The deflection $\Delta f$ during heating is a measure of the magnitude of the two-way shape memory effect. After cooling to room temperature, the element returns to its original shape, according to Item 3. This cycle can be repeated at will.

A round swaged tension rod is shown in FIG. 2. Item 6 is the tension rod made from a memory alloy after swaging. Item 7 indicates the swaged surface layer. Upon heating, the rod expands parallel to the longitudinal axis by the amount $\Delta l$ (indicated in the figure), which is a measure of the magnitude of the two-way effect. This effect is reversible.

FIG. 3 shows two variants of the principle of inhomogeneous deformation of a short rod by means of compression punches. Item 8 is a short rod made from a memory alloy. Item 9 is a compression punch with rounded convex face. Item 10, however, is a compression punch with a reduced cross-section compared to Item 8, and a planar face. The arrows indicate the movements of the punches 9 and 10, respectively, during the deformation of the rod (8).

Figure 4A:
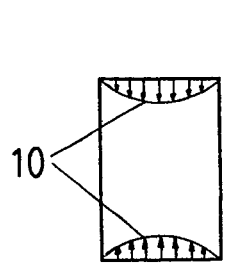
Figures 4B, 4C:
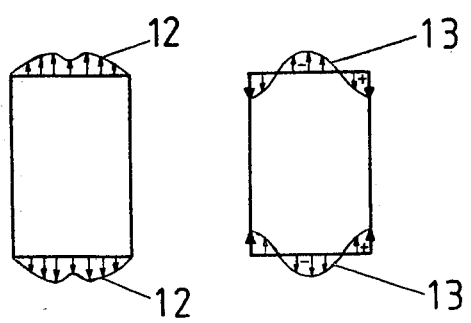

FIG. 4 shows the deformation and stress distribution in a short rod inhomogeneously deformed according to FIG. 3. Curve 11 in FIG. 4a shows the profile of the deformation over the cross-section of the rod. While the outer layer remains practically undeformed, the highest deformation (in this case, compression) is found in the center of the rod. Curve 12 in FIG. 4b shows the movement distribution (strain distribution) during the course of the uninhibited one-way shape memory effect. Finally, Curve 13 in FIG. 4c shows the residual stress distribution after the one-way shape memory effect. The outer layer and the core of the element are now stressed against one another. The arrows in FIGS. 4a, 4b, and 4c indicate the direction of the deformation, movement and stress, respectively.

Working Example I

See FIG. 1.

A memory alloy of the following composition was used as a starting material:

Al: 13.2 wt. %
Ni: 3.2 wt. %
Cu: balance

A bending element (2) of dimensions 2.5 mm by 2.5 mm by 35.0 mm was machined from a hot worked band, solution treated for 15 minutes at a temperature of 950° C., and then water quenched. One side of the element was then shot peened for two minutes on one side using steel balls and an intermediate impingement intensity. After shot peening, the element had a bent shape (according to 3) with the shot peened surface (4) having compressive stresses. This treatment induced a two-way shape memory effect in the rod. Upon heating to 220° C., the rod changed its shape to a form illustrated by 5. The direction of movement was contrary to that induced by shot peening. The deflection $\Delta f$ in this case was 2.2 mm corresponding to a strain (two-way effect)

of approximately 0.6%. The deformation occurring during shot peening can be compensated by using a rod with an initially concave surface, and a straight element obtained; the rod then reverts to a concave shape during heating.

Working Example II

See FIG. 2.

A rod having a round cross-section was machined from the same material as in Example I. The rod had a diameter of 9 mm and a length of 180 mm. The rod was solution treated for 15 min at a temperature of 950° C. and subsequently quenched in water. The rod was then heated to 300° C. and swaged at this temperature to a diameter of 8.5 mm, corresponding to a reduction of approximately 5%. The swaging dies were preheated to 350° C. Item 6 in FIG. 2 represents a tension rod, and Item 7 the swaged surface layer. Upon heating from room temperature to 250° C., a change in length $\Delta l$, corresponding to a strain of approximately 0.2%, was observed. This length change was reversible, that is, it could be reproduced at will by cycling through this temperature range.

The above examples are but a few of the possible applications of the invention. According to FIGS. 3 and 4, similar effects can be achieved with short compression/tension rods. Similarly, components carrying shear loads (e.g.-torsion rods and springs) can be produced.

The important principle is that of the inhomogeneous deformation; that is, the component must have zones of varying degrees of deformation over the cross-section. In this way, the strongly deformed parts of the cross-section act as support constituents hindering the one-way effect.

All memory alloys which exhibit, by nature, only a one-way effect, or a two-way effect of no practical use, are suitable for this treatment. Materials which are particularly suitable are Cu-Al-Ni, Cu-Al, Cu-Zn-Al, Ti-V, Ti-Nb, and Ni-Ti-Cu alloys. The new process makes it possible to induce a noticeable two-way effect in materials exhibiting only a one-way effect, especially the $\beta$-brasses. This opens new fields of application for these materials, whose application potential was, until now, limited.

We claim:

1. A process for inducing a reversible two-way shape memory effect in an already existing component made of a shape memory alloy exhibiting, under normal conditions, only a one-way effect comprising first solution treating said component in a temperature range of $\beta$-solid solution, subsequently water quenching and deforming inhomogeneously in such a way that a cross-section of said component is deformed to a sufficient degree to act as a counter-spring (due to the residual stresses in the component) suppressing the one-way effect in the remainder of the cross-section (either undeformed or deformed to a lesser extent).

2. The process according to claim 1, wherein said memory alloy is a Cu-Al-Ni, Cu-Al, Cu-Zn-Al, Ti-V or Ti-Nb alloy.

3. The process according to claim 1 wherein a partial surface of the component is inhomogeneously deformed by shot peening.

4. The process according to claim 1, wherein said component is a round rod, a surface of which is at least partially inhomogeneously deformed by swaging.

5. The process according to claim 1, wherein the component is a short round or prismatic rod, a cross-section of which is inhomogeneously deformed by compression in such a way that the core of the rod is deformed more than the surface.

* * * * *